United States Patent [19]
Larson et al.

[11] Patent Number: 5,702,676
[45] Date of Patent: Dec. 30, 1997

[54] PRODUCTION METHOD FOR OBTAINING PRESSABLE POWDER YIELDING HIGH SINTER DENSITY PELLETS WITHOUT DEFECTS

[75] Inventors: Richard I. Larson, Wilmington; Stephen E. Selby, Wrightsville; Michael P. Enger, Wilmington, all of N.C.

[73] Assignee: General Electric Company, Schenectady, N.Y.

[21] Appl. No.: 667,795

[22] Filed: Jun. 20, 1996

[51] Int. Cl.⁶ .................................................. C01G 43/025
[52] U.S. Cl. .............................. 423/261; 252/643; 423/10
[58] Field of Search ..................... 423/261, 10; 252/643

[56] References Cited

U.S. PATENT DOCUMENTS

| | | |
|---|---|---|
| 2,897,046 | 7/1959 | Bohlman . |
| 3,112,275 | 11/1963 | Pollock et al. . |
| 4,656,015 | 4/1987 | Divins et al. .................... 423/261 |
| 5,000,927 | 3/1991 | Babb et al. ....................... 423/10 |
| 5,401,664 | 3/1995 | Larson et al. ................... 436/173 |
| 5,514,306 | 5/1996 | Karson et al. ................... 264/0.5 |

*Primary Examiner*—Nigoclan Mai
*Attorney, Agent, or Firm*—Nixon & Vanderhye

[57] ABSTRACT

This invention provides an improved process of preparing $UO_2$ powder from poor quality, partially oxidized powder containing organic and inorganic impurities. The process is illustrated in the flow chart of FIG. 1 which includes the steps of (a) oxidizing a uranium-containing scrap also containing inorganic and cationic organic impurities; (b) solubilizing, typically with nitric acid, the uranium contained in the oxidized scrap to produce uranyl nitrate; (c) solvent extracting the solubilized product of step (b) to remove cation impurities to provide a purified uranyl nitrate solution; (d) precipitating the purified uranyl nitrate with ammonia to form ammonium diuranate powder; and (e) calcining and passivating the ammonium diuranate powder to produce $UO_2$ powder; and optionally (f) forming the $UO_2$ powder of step (e) into pellets and sintering the formed pellets to produce sintered $UO_2$ pellets.

6 Claims, 3 Drawing Sheets

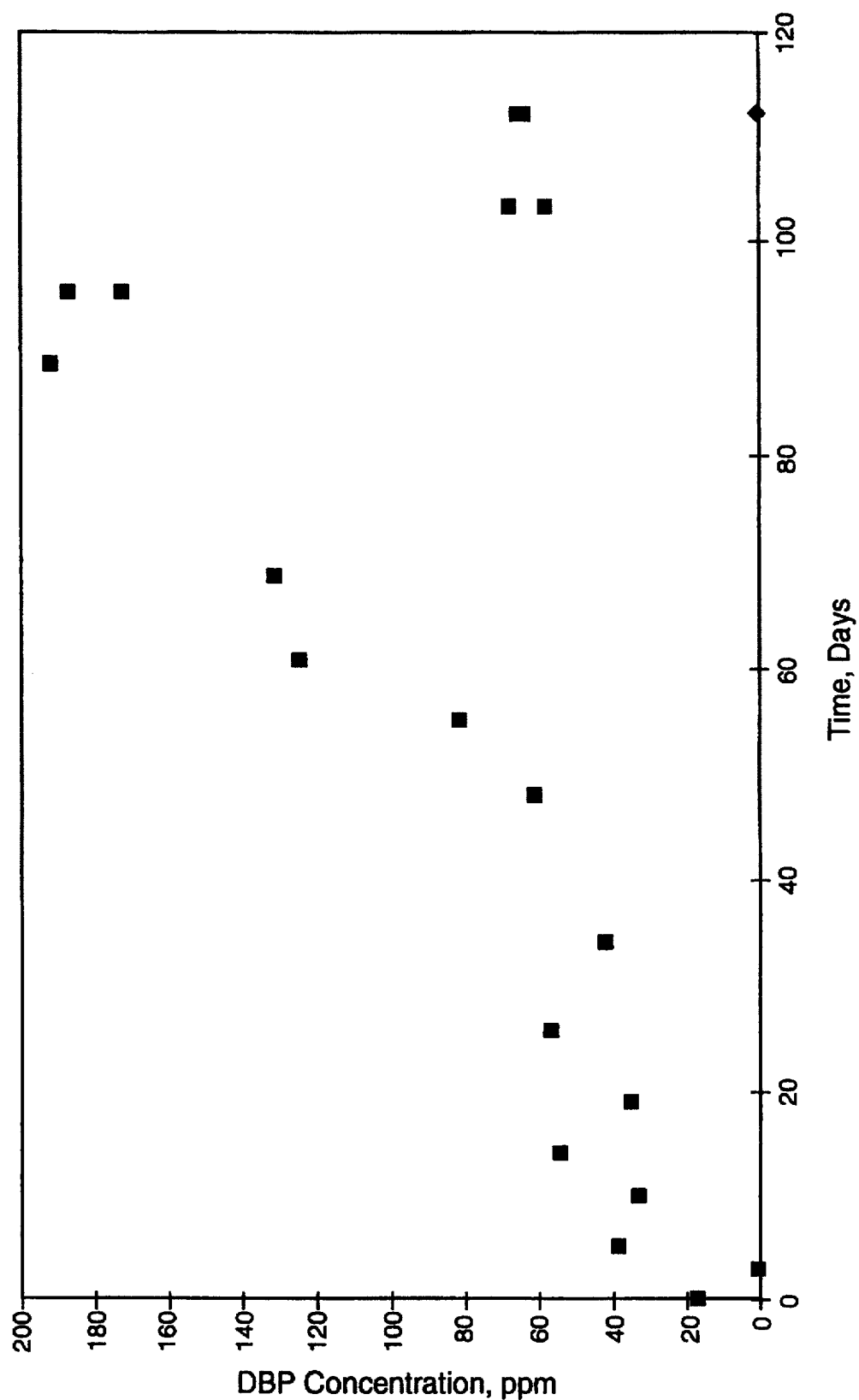

Sinter Density vs. Time

DBP Concentration vs. Time

PRODUCTION METHOD FOR OBTAINING PRESSABLE POWDER YIELDING HIGH SINTER DENSITY PELLETS WITHOUT DEFECTS

This invention relates to a process of preparing sintered high density fuel pellets from processed, recovered uranium-containing scrap by recovering $UO_2$ powder free or substantially free of defect-causing impurities.

BACKGROUND OF THE INVENTION

Organic solvents are used in procedures for recovering uranium as a powder from scrap or highly contaminated material in which it is contained. While effective initially in yielding fuel pellets, over time and with reuse of this solvent the quality of the fuel pellets obtained declined rapidly and gave only inferior, commercially unacceptable sintered pellets.

It has been determined that organic impurities in the solvent extraction process for recovering uranium prevent the formation of $UO_2$ powder that can be pressed and fabricated into high sinter density $UO_2$ pellets without defects. A process is provided herein for removing the defect-causing organic impurities from the extraction solvent and thereby restoring the reclaim solvent to its original condition and thereby providing a $UO_2$ powder that is pressable and capable of yielding high sinter density, defect-free pellets.

U.S. Pat. No. 5,401,664 to Larson et al (the disclosure of which is incorporated by reference) states that the reaction between nitric acid and tributyl phosphate leads to the formation of dibutyl phosphate. By monitoring the concentration of dibutyl phosphate in the solvent, a good correlation was found with the poor quality of the $UO_2$ pellets that were formed. Furthermore, other organic compounds were also observed to buildup in the solvent, and these were also found in the uranyl nitrate precipitation feed or the solvent extraction product.

BRIEF DESCRIPTION OF THE DRAWINGS

FIG. 2 is a a graph showing the concentration of dibutyl phosphate (DBP) over time in the organic solvent used in the solvent extraction step of the process of the invention;

DESCRIPTION OF THE INVENTION

Figure 1:
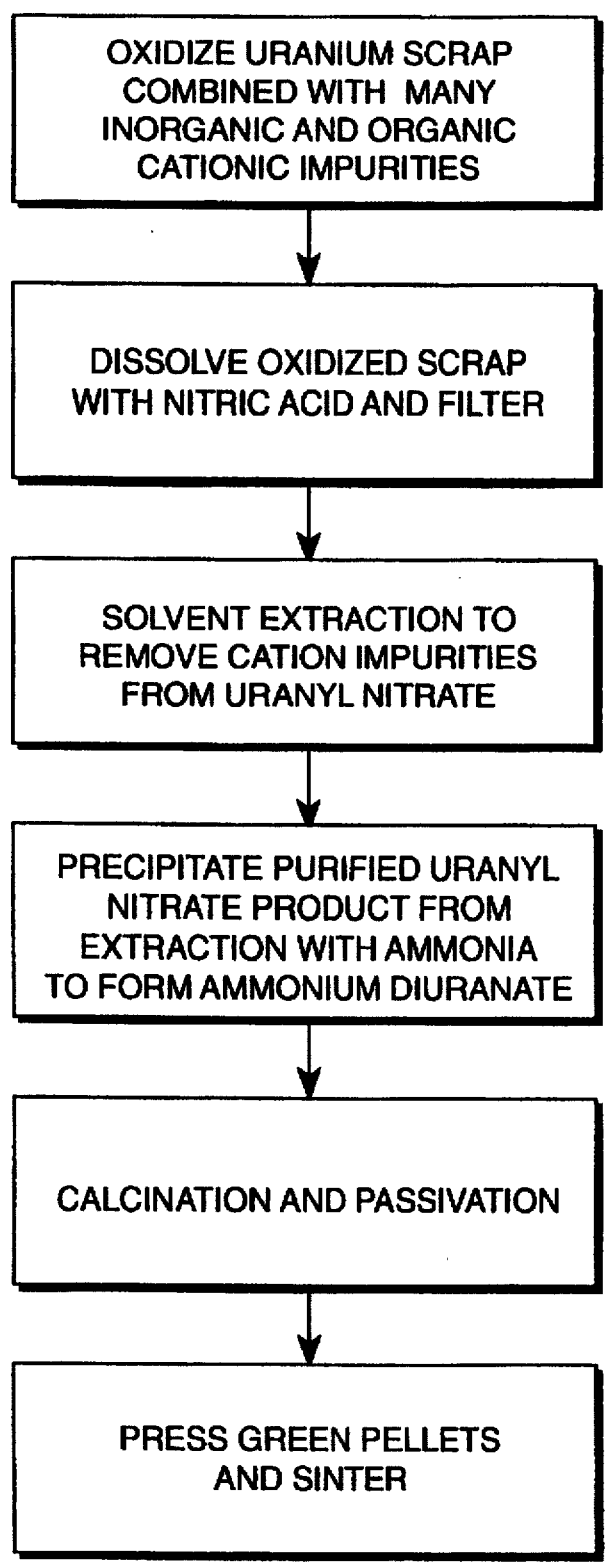
FIG. 1 is a flow chart showing the operative steps of the process for preparing $UO_2$ powder and pellets.

This invention provides an improved process of preparing $UO_2$ powder contained in poor quality, partially oxidized powder containing organic and inorganic impurities including the steps of (a) oxidizing a uranium-containing scrap also containing inorganic and cationic organic impurities; (b) solubilizing, typically with nitric acid, the uranium contained in the oxidized scrap to produce uranyl nitrate; (c) solvent extracting the solubilized product of step (b) to remove cation impurities to provide a purified uranyl nitrate solution; (d) precipitating the purified uranyl nitrate with ammonia to form ammonium diuranate powder; and (e) calcining and passivating the ammonium diuranate powder to produce $UO_2$ powder, and optionally (f) forming the $UO_2$ powder of step (e) into pellets and sintering the formed pellets to produce sintered $UO_2$ pellets.

The organic solvent used in extraction step (c) may be stripped to reduce the dibutyl phosphate content to at most about 40 ppm, then recycled. The $UO_2$ powder produced in step (e) has a surface area of at least about 4 $m^2$/gm. The formed pellets, prior to sintering, typically have a green density less than about 5.20 gm/$cm^3$ and a sinter density of at least about 98.0% theoretical density.

Also disclosed is an improved process of preparing $UO_2$ powder or pellets from a uranium source containing organic impurities, inorganic impurities and cationic impurities including tributyl phosphate by solubilizing the uranium source with nitric acid which converts tributyl phosphate to dibutyl phosphate, the improvement including monitoring the concentration of dibutyl phosphate during the process and maintaining the concentration to at most 100 ppm.

A major portion of the organic impurities were removed from the solvent by solvent extracting without the uranyl nitrate feed and stripping the solvent of these organic impurities for at least 24 hours. A pressable powder was obtained that yielded a high-sinter density $UO_2$ pellet, in the same manner as new uncontaminated solvent. Prior to the stripping operation using the contaminated solvent, the powder did not press well, and produced sinter pellets with defects and a sinter density of <98.0% theoretical density. In the extreme case at sinter densities below 97.5% theoretical density, the green density of the pellets is greater than 5.30 gm/$cm^3$.

The stripping method forming part of the present invention also extends the lifetime of the extraction solvent and eliminates the need for replacing contaminated solvent on a frequent basis.

Copending related application Ser. No. 08/584,547 filed Jan. 11, 1996 of Larson et al. (the disclosure of which is hereby incorporated by reference) describes a process to reclaim $UO_2$ scrap used in the manufacture of weapons to produce commercial grade $UF_6$ fuel as a powder that yields high sinter density pellets without defects. The difference in the process described herein and the process described in this earlier application is the origin of the feed. The process of this application reclaims poor quality, partially oxidized powder, press scrap, and grinder swarf. These materials contain a small amount of organic impurities and are given the generic name "clean scrap". The organic impurities are easily removed by decomposition in a high temperature oxidation furnace.

Waste streams from other processes having their own impurities are often then added to uranium scrap prior to oxidization. When other cationic impurities are present such as iron, gadolinia, calcium, zirconium, aluminum, etc., a solvent extraction process is required. This unit operation is located between the dissolution and precipitation steps as shown in FIG. 1. The uranyl nitrate feed following dissolution and filtration is contaminated with cation impurities from many other waste streams. Solvent extraction removes these impurities and provides a "clean" uranyl nitrate feed for precipitation which, in turn, allows further processing to produce $UO_2$ powder and pellets.

Using procedures similar to those described in U.S. Pat. No. 5,401,664 to Larson et al., uranium is extracted into the solvent, while most of the remaining cations remain in the aqueous nitrate stream, which flows countercurrent to the solvent. The aqueous nitrate acid feed used initially to solubilize the uranium is discharged from the extraction column to the waste stream. The extracted uranium is eventually stripped from the solvent producing a "clean" uranyl nitrate feed for powder production. The purified uranyl nitrate solution is precipitated with ammonia to produce ammonium diurnate, the slurry is centrifuged, and fed to the calciner to produce $UO_2$ powder.

The process requires accurate control of the ADU precipitation process to obtain a high surface area $UO_2$ powder. Important precipitation parameters are the uranyl nitrate and free acid concentrations. The latter must be known and controlled to within three decimal places, prior to adding ammonia to the solution.

Accurate precipitation control and also temperature control of the calciner produce a high surface area (>4 $m^2$/gm) as defined herein require passivation, otherwise the powder will oxidize or burn. A high surface area powder is required to obtain high sinter density, good press yields, and quality sintered pellets without defects such as radial cracks, chips and end flakes.

During production operation, the $UO_2$ powder from the usual reclaim process frequently is not pressable; that is, green (unsintered) and sintered pellets chip, crack, end flake, etc. A high sinter density, >98.0% TD, is not achieved. Lowering the calciner temperature, which usually helps to increase the sinter density, no longer produces the desired product. This type of operation is characterized by a low surface area powder, sometimes as low as 2.8 $m^2$/gm. In extreme cases, the green pellet density is greater than 5.30 gm/$cm^3$.

Careful monitoring of the precipitation process indicated that the important parameters were within specification. Other steps in the process were also investigated including calciner temperatures, process flows, and feed stream concentrations. They did not appear to cause the problem or poor quality pellets to produce a fully acceptable sintered product having the required density.

Sampling the extraction solvent for dibutyl phosphate weekly showed an increase in the dibutyl phosphate concentration with time as shown in FIG. 2. This was accompanied with an increase in other organic impurities, such as phenocylopropane, tetrahydrodibenzofuran. The uranyl nitrate feed to precipitation produced a low sinter density, high green density $UO_2$ pellet with significant defects. According to the process of this invention stripping these organic impurities from the solvent for 24 to 48 hours returned the solvent to a condition that allowed a quality, sinterable powder to be produced.

Figure 3A:
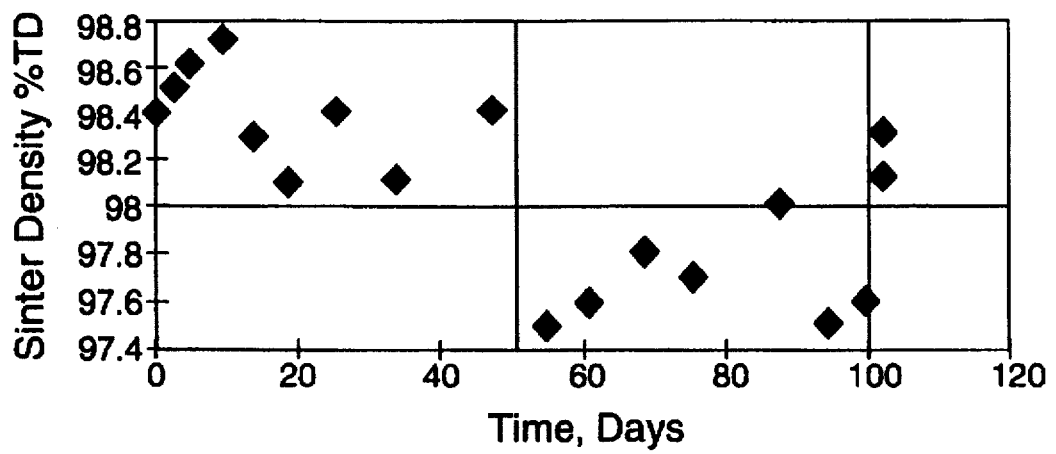
FIG. 3A is a graph comparing the sinter density of pellets over time related to DBP concentration over the same period of time.
Figure 3B:
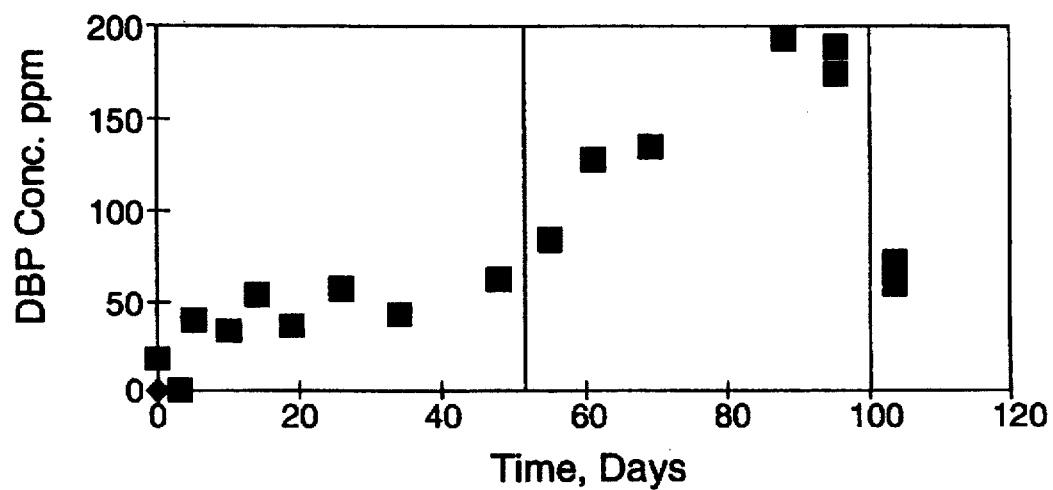
FIG. 3B is a graph showing the DBP concentration in the organic solvent used in the solvent extraction step over the same period of time as FIG. 3A and relating a decrease in sinter density of the final products to the DBP concentration in the organic extraction solvent.

FIG. 3 shows these results. A low dibutyl phosphate concentration (<100 ppm) was observed for 50 days of solvent extraction operation. The resulting powder was pressable, readily produced pellets without defects, and a sinter density above 98% TD was observed. By contrast, as the dibutyl phosphate concentration increased to values near 200 ppm, the sintered pellets had significantly more defects with sinter density being reduced to below 98% TD. Also, the powder did not press well with the green density being greater than 5.30 gm/$cm^3$ in extreme cases.

After about 100 days of operation, the solvent was stripped for 36 hours, and the DBP concentration reduced to below 100 ppm. Powder from the cleaned solvent pressed well. The sintered pellets were without defects and had a sinter density above 98% TD.

These results indicate that as the organic impurities buildup in the solvent, the quality of the uranyl nitrate feed from solvent extraction is reduced due to the presence of these organics. Consequently, a "clean" or purified uranyl nitrate solution is not fed to ADU precipitation. Instead, the organic impurities prevent the formation of ADU particles of proper size and morphology required to produce a high surface area powder, and the necessary product—high sinter density pellets without defects. By stripping the solvent to remove these organic impurities, a high quality powder and sintered pellet are obtained.

What is claimed is:

1. A process of preparing $UO_2$ powder comprising the steps of:

(a) oxidizing uranium-containing scrap also containing inorganic and cationic organic impurities;

(b) solubilizing the uranium contained in the oxidized scrap to produce uranyl nitrate;

(c) solvent extracting the solubilized product of step (b) to remove cation impurities to provide a purified uranyl nitrate solution;

(d) precipitating the purified uranyl nitrate with ammonia to form ammonium diuranate powder; and (e) calcining and passivating the ammonium diuranate powder to produce $UO_2$ powder, wherein the solvent after use in extraction step (c) contains dibutyl phosphate and is stripped to reduce the dibutyl phosphate content to at most about 40 ppm.

2. The process of claim 1 including the additional step of:

(f) forming the $UO_2$ powder of step (e) into pellets and sintering the formed pellets to produce sintered $UO_2$ pellets.

3. The process of claim 1, wherein the uranium is solubilized in step (b) with nitric acid.

4. The process of claim 2, wherein the formed pellets, prior to sintering, have a green density less than about 5.30 gm/$cm^3$.

5. The process of claim 2, wherein the sintered pellets have a sinter density of at least about 98.0% theoretical density.

6. The process of claim 1, wherein the $UO_2$ powder produced in step (e) has a surface area of at least about 4 $m^2$/gm.

* * * * *